US012768286B2

(12) United States Patent
Ramsey

(10) Patent No.: US 12,768,286 B2
(45) Date of Patent: Oct. 20, 2026

(54) THERMAL ZONE COOLING IN A BEARING COMPARTMENT

(71) Applicant: RTX Corporation, Farmington, CT (US)

(72) Inventor: Christopher D. Ramsey, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 102 days.

(21) Appl. No.: 18/495,937

(22) Filed: Oct. 27, 2023

(65) Prior Publication Data

US 2024/0151266 A1 May 9, 2024

Related U.S. Application Data

(60) Provisional application No. 63/423,357, filed on Nov. 7, 2022.

(51) Int. Cl.
*F16C 33/10* (2006.01)
*F01D 25/12* (2006.01)
*F01D 25/16* (2006.01)
*F01D 25/18* (2006.01)

(52) U.S. Cl.
CPC ......... *F01D 25/125* (2013.01); *F01D 25/164* (2013.01); *F01D 25/18* (2013.01); *F16C 33/1085* (2013.01)

(58) Field of Classification Search
CPC ...... F01D 25/125; F01D 25/164; F01D 25/18; F05D 2260/205; F05D 2260/98; F05D 2240/128; F16C 33/106; F16C 33/1085; F16C 33/6659
See application file for complete search history.

(56) References Cited

U.S. PATENT DOCUMENTS

| | | | |
|---|---|---|---|
| 9,234,439 B2 | 1/2016 | Demitraszek, Sr. et al. | |
| 9,500,230 B2 * | 11/2016 | Hiller | F16C 33/6681 |
| 10,946,555 B2 | 3/2021 | Trivedi et al. | |
| 11,230,946 B2 | 1/2022 | Davis et al. | |
| 11,268,573 B2 * | 3/2022 | Lefebvre | F16C 33/6659 |
| 11,519,296 B1 * | 12/2022 | Stiehler | F01D 25/162 |
| 2015/0003995 A1 | 1/2015 | Xu | |
| 2021/0062679 A1 * | 3/2021 | Marquie | F01D 25/183 |
| 2022/0397039 A1 * | 12/2022 | Neuberger | F01D 25/16 |

FOREIGN PATENT DOCUMENTS

| | | |
|---|---|---|
| CA | 3111919 A1 | 9/2021 |
| EP | 2971688 B1 | 11/2018 |
| RU | 2583206 C1 | 5/2016 |

OTHER PUBLICATIONS

EP Search Report Issued Mar. 20, 2024 in U421884EP, 8 pages.

* cited by examiner

*Primary Examiner* — Brian P Wolcott
(74) *Attorney, Agent, or Firm* — CANTOR COLBURN LLP

(57) ABSTRACT

According to an aspect, a bearing compartment includes a body, one or more oil cooling channels integrally formed within the body, and one or more oil nozzles coupled to the one or more oil cooling channels. At least one of the one or more oil nozzles is oriented to direct oil toward a thermal zone with a predicted hot spot within the bearing compartment.

8 Claims, 7 Drawing Sheets

THERMAL ZONE COOLING IN A BEARING COMPARTMENT

CROSS-REFERENCE TO RELATED APPLICATIONS

This application claims the benefit of U.S. Provisional Application No. 63/423,357 filed Nov. 7, 2023, the disclosure of which is incorporated herein by reference in its entirety.

BACKGROUND

Exemplary embodiments of the present disclosure relate generally to gas turbine engines and, in one embodiment, to thermal zone cooling in a bearing compartment of a gas turbine engine.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotation of a propeller/fan or to produce electricity in a generator.

Certain parts, such as a bearing compartment, in a gas turbine engine need a supply of oil for cooling and/or lubrication. In conventional systems, oil is supplied via tubes that are separate from other components. In tight locations, there may be limited options where tubes can be added to reach oil nozzles. This can constrain oil nozzle placement and make assembly difficult where multiple tubes must be routed around other components. Some locations may experience higher heat loads during operation as compared to other locations.

BRIEF DESCRIPTION

According to an aspect, a bearing compartment includes a body, one or more oil cooling channels integrally formed within the body, and one or more oil nozzles coupled to the one or more oil cooling channels. At least one of the one or more oil nozzles is oriented to direct oil toward a thermal zone with a predicted hot spot within the bearing compartment.

In addition to one or more of the features described above, or as an alternative to any of the foregoing embodiments, the at least one of the one or more oil nozzles can be integrally formed with the body of the bearing compartment.

In addition to one or more of the features described above, or as an alternative to any of the foregoing embodiments, the body can include a housing of the bearing compartment.

In addition to one or more of the features described above, or as an alternative to any of the foregoing embodiments, the body can include a spring integrally formed with the housing.

In addition to one or more of the features described above, or as an alternative to any of the foregoing embodiments, the one or more oil cooling channels can be routed through at least one annular support member of the spring.

In addition to one or more of the features described above, or as an alternative to any of the foregoing embodiments, the one or more oil cooling channels can include one or more struts of the spring.

In addition to one or more of the features described above, or as an alternative to any of the foregoing embodiments, placement and orientation of the one or more oil nozzles can be configured based on a thermal model of a plurality of thermal zones within the bearing compartment.

According to an aspect, a gas turbine engine includes a compressor section, a turbine section, a shaft coupled to the compressor section and the turbine section, and a bearing system configured to support rotation of the shaft. The bearing system include a bearing compartment with a body, one or more oil cooling channels integrally formed within the body, and one or more oil nozzles coupled to the one or more oil cooling channels. At least one of the one or more oil nozzles is oriented to direct oil toward a thermal zone with a predicted hot spot within the bearing compartment.

According to an aspect, a method of manufacturing a bearing compartment is provided. The method includes analyzing a thermal model for thermal data associated with a plurality of thermal zones within a bearing compartment having a modeled temperature above a threshold level to identify a predicted hot spot. The method also includes modifying a design file of the bearing compartment to add one or more oil cooling channels in a body of the bearing compartment and one or more oil nozzles coupled to the one or more oil cooling channels and directed toward the predicted hot spot. The method further includes providing the design file to additive manufacturing equipment to build the body of the bearing compartment including the one or more oil cooling channels integrally formed within the body.

In addition to one or more of the features described above, or as an alternative to any of the foregoing embodiments, the method can include controlling the additive manufacturing equipment to additively manufacture the bearing compartment based on the design file.

In addition to one or more of the features described above, or as an alternative to any of the foregoing embodiments, the method can include where placement and orientation of the one or more oil nozzles are configured based on the thermal model and a three-dimensional structural model of the bearing compartment.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
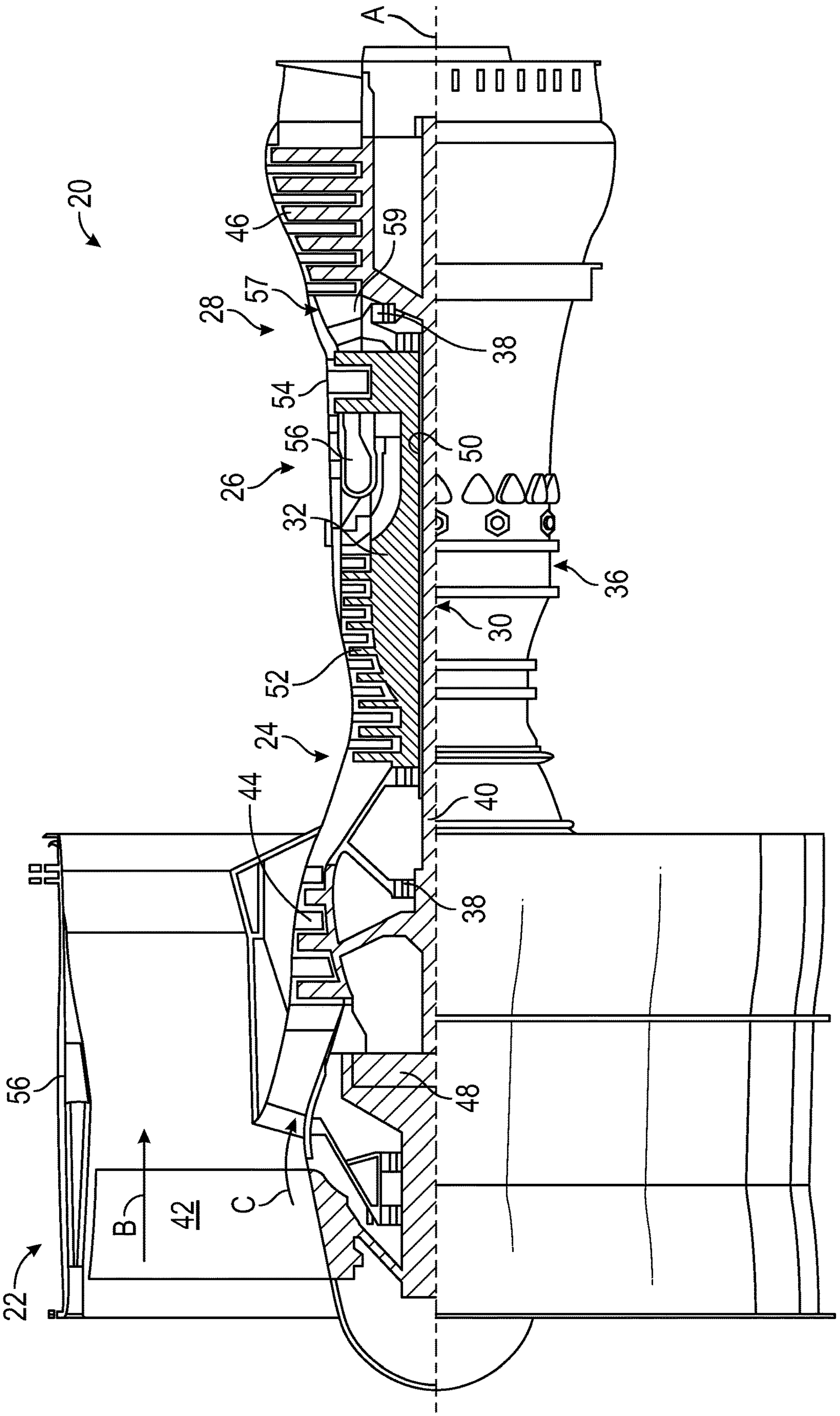
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ\ \text{R})/(518.7^\circ\ \text{R})]^{0.5}$. The "Low corrected fan tip speed" as disclosed herein according to one non-limiting embodiment is less than about 1150 ft/second (350.5 m/sec).

Figure 2:
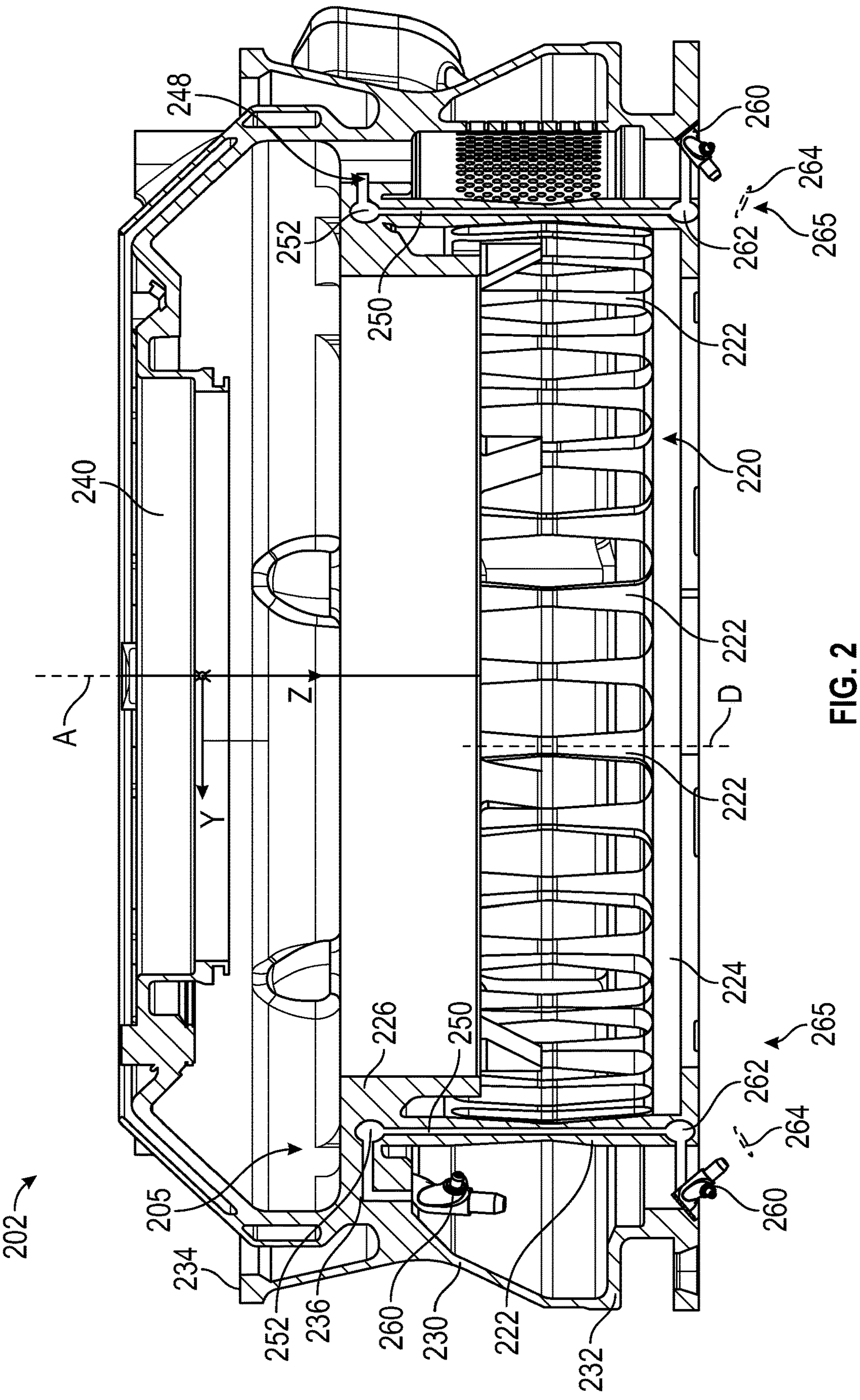
FIG. 2 is a side view of a bearing compartment with one or more oil cooling channels in accordance with embodiments.
Figure 3:
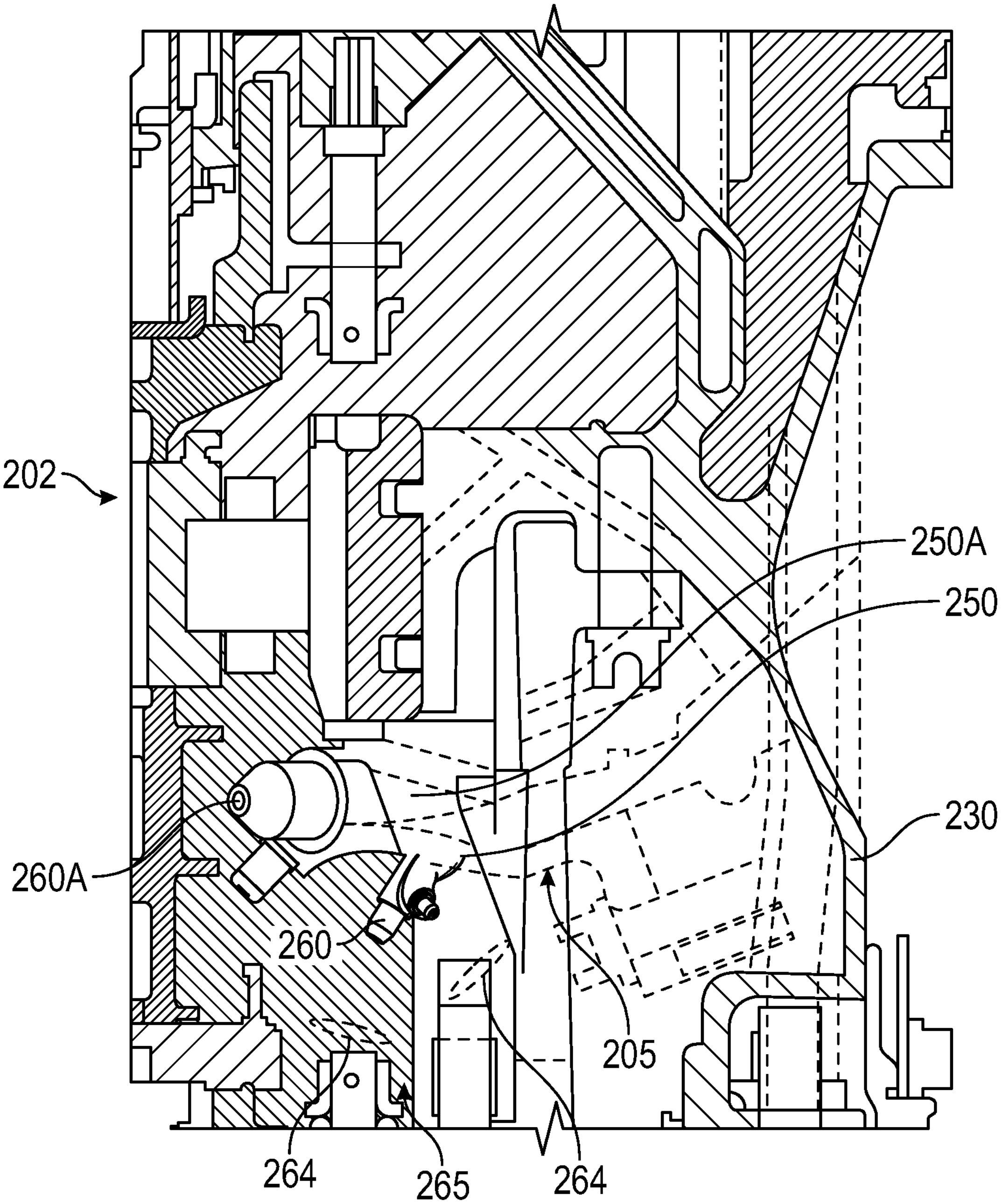
FIG. 3 depicts an example of oil nozzle placement proximate to predicted hot spots in accordance with embodiments.
Figure 4:
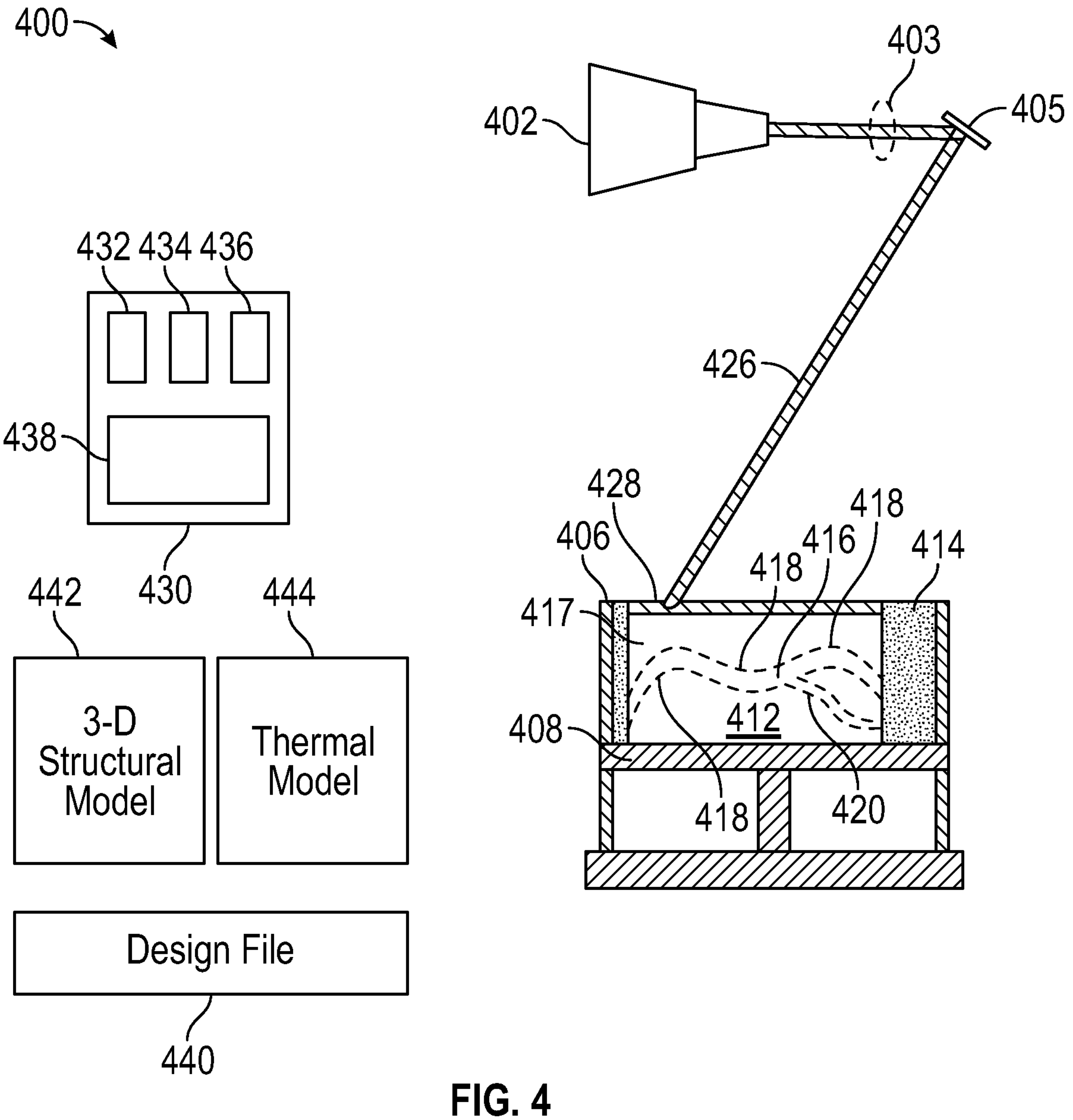
FIG. 4 depicts an example of additive manufacturing equipment in accordance with embodiments.

With continued reference to FIG. 1 and with additional reference to FIGS. 2-4, a bearing compartment 202 of the gas turbine engine 20 of FIG. 1 can be additively manufactured and include a number of features with a complex geometry. The bearing compartment 202 can be part of the bearing systems 38 to support rotation of one or more shafts, such as the inner shaft 40 or the outer shaft 50. The bearing compartment 202 can include a spring 220 integrally formed with a housing 230 of the bearing compartment 202. The housing 230 can include a lower portion 232 and an upper portion 234. Rather than separately manufacturing the lower portion 232 and upper portion 234, the housing 230 can be monolithically formed through an additive manufacturing process.

The upper portion 234 of the housing 230 can include an overhang region 236 that is supported by the spring 220 during an additive manufacturing build process. For example, the bearing compartment 202 can be manufactured using a powder bed fusion process, e.g., laser or electron beam based, to progressively build the housing 230 from the lower portion 232 to the upper portion 234 while also building the spring 220 within an interior of the housing 230. Forming the spring 220 integrally with the housing 230 can enhance structural stability and prevent the spring 220 from rotating relative to the housing 230 during assembly of the bearing compartment 202.

The spring 220 can include a plurality of struts 222 that extend axially within the housing 230. The spring 220 can be a squirrel cage spring, and a centerline D of the struts 222 can extend axially in parallel to an axis of rotation (e.g., engine central longitudinal axis A) defined within a central cavity 240 of the bearing compartment 202. The struts 222 can extend between a first annular support member 224 (e.g., a lower support) and a second annular support member 226 (e.g., an upper support).

In some embodiments, the spring 220 can include one or more oil cooling channels 250 internally fabricated within one or more struts 222 of the spring 220. The oil cooling channels 250 can provide a path for oil flow through the spring 220 to deliver oil at or below the lower support 224. The oil cooling channels 250 can be fabricated within the upper support 226 and through two or more of the struts 222. The oil cooling channels 250 within the upper support 226 can form a manifold 252 to distribute oil to two or more of the struts 222. Oil can be delivered directly to an oil nozzle 260 or be routed through one or more components of the bearing compartment 202 before reaching an oil nozzle 260 after flowing through the oil cooling channels 250. In some embodiments, all of the struts 222 can include the oil cooling channels 250. Alternatively, a subset of the struts 222 can include the oil cooling channels 250, such as every other strut 222, every third strut 222, every fourth strut 222, etc. The number of struts 222 that incorporate the oil cooling channels 250 can be determined by an oil flow and pressure analysis. Incorporating the oil cooling channels 250 in two or more of the struts 222 can provide a substantially symmetrical design of the spring 220 and multiple distribution paths. The path of the oil cooling channels 250 within the housing 230 can be determined based on structural analysis and flow dynamics of the oil.

The upper support 226 can include the manifold 252 and/or the lower support 224 can include a lower manifold 262 that allows oil circulation above and/or below the struts 222 within the spring 220. As one example, oil can enter the oil cooling channels 250 at port 248 and circulate through the manifold 252, lower manifold 262, and oil cooling channels 250 within the struts 222 to reach oil nozzles 260 oriented to direct oil toward one or more thermal zones 265 with predicted hot spots 264 within the bearing compartment 202. Thermal zones 265 can be defined within regions where heat accumulates due to circulation, movement of components, transfer from external sources, and other such factors. The predicted hot spots 264 may have a locally higher temperature within a thermal zone 265 than surrounding areas during operation of the gas turbine engine 20. Although the example of FIG. 2 depicts the oil cooling channels 250 integrally formed with the housing 230 and spring 220, the oil cooling channels 250 can be integrally formed with other components of the bearing compartment 202. Further, the oil cool channels 250 can be integrally formed through additive manufacturing with any component of the body 205 of the bearing compartment 202. The body 205 can refer to any additively manufactured component of the bearing compartment 202. Thus, the body 205 can include a combination of the housing 230 and spring 220, where the housing 230 and spring 220 are integrally formed. Although the example of FIG. 2 depicts the housing 230 and spring 220 integrally formed, in other embodiments, the spring 220 may be separately formed from the housing 230. In such embodiments, the oil cooling channels 250 may be formed in the housing 230 and/or other components of the body 205 and need not be formed within the spring 220.

FIG. 3 depicts an example of oil nozzle placement proximate to predicted hot spots 264 of a thermal zone 265 in accordance with embodiments. In the example of FIG. 3, a design of the bearing compartment 202 can include oil nozzles 260A that direct oil from an oil passage 250A to targeted lubrication areas. Through a model-based thermal analysis of a design of the bearing compartment 202, hot spots 264 can be identified. Where internal capacity is available to route an oil cooling channel 250 proximate to the hot spots 264 while maintaining the structural integrity of the body 205, the design of the bearing compartment 202 can be modified to include the oil cooling channel 250 to be formed during an additive manufacturing process. An oil nozzle 260 can be added to the design as a separate component coupled to the body 205 or integrally formed with the body 205 with an orientation to direct oil toward thermal zone 265 with one or more predicted hot spots 264 within the bearing compartment 202. Multiple oil cooling channels 250 and/or oil nozzles 260 can be added.

FIG. 4 depicts an example of additive manufacturing equipment 400, which can be a laser powder bed fusion system. In the example of FIG. 4, the additive manufacturing equipment 400 includes an energy source 402, a lens system 403, one or more mirrors 405, and a build tank 406. The build tank 406 includes a base plate 408. The base plate 408 can be adjustable to reposition an additively-manufactured part 412 as the additively-manufactured part 412 is built in a powder bed 414 of the build tank 406. Alternatively, the base plate 408 and additively-manufactured part 412 can remain in a fixed position. The energy source 402 can emit a laser 426 (also referred to as laser beam 426) to form a new layer 428 of material fused on an uppermost layer of the additively-manufactured part 412. One or more of the mirrors 405 can be adjusted to change the target location of the laser 426. Various features can be formed within the additively-manufactured part 412 as it is manufactured, such as one or more passages 416 that may have a profile of curvature including one or more curves 418. Rather than forming the one or more passages 416 through post-processing, the one or more passages 416 can be formed by leaving gap space in multiple build layers in a body 417 of the additively-manufactured part 412. The passages 416 can also include one or more branches or other passages 420 that fork from a main passage.

The build process of the additive manufacturing equipment 400 can be controlled by a control system 430. The control system 430 can include a processing system 432 and a memory system 434, where the memory system 434 stores executable instructions to configure the processing system 432 to perform a plurality of operations. The processing system 432 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 434 can store data and instructions that are executed by the processing system 432. In embodiments, the memory system 434 may include random access memory (RAM), read only memory (ROM), or other electronic, optical, magnetic, or any other computer readable medium onto which is stored data and algorithms in a non-transitory form. The control system 430 can also include an input/output (I/O) interface 436 operable to interface with various components of the additive manufacturing equipment 400 to sense, control, and communicate with components of FIG. 4 and other components, such as a user interface 438. The user interface 438 can include a display, buttons, keys, switches, and other such interfaces for accepting user input and displaying output.

The additively-manufactured part 412 can be the bearing compartment 202 of FIG. 2, and the passages 416, 420 can be the oil cooling channels 250, for example. A design file 440 can define parameters used by the additive manufacturing equipment 400 to build the additively-manufactured part 412. The design file 440 can include multiple files, modules, data, and the like to form the additively-manufactured part 412 according to a three-dimensional (3-D) structural model 442. Thermal properties of the additively-manufactured part 412 and other elements can be defined by a thermal model 444. Thermal data of thermal model 444 of the bearing compartment 202 can be used during the design process to identify and target specific thermal zones 265. Where hot spots 264 are identified within the bearing compartment 202, internal oil routing paths, such as oil cooling channel 250, can be added to one or more components to direct oil to the hot spots 264. Oil routing paths can be added to the 3-D structural model 442 to observe impacts to the structure and may be added to the thermal model 444 to observe thermal effects with various oil flows. The models 442, 444 can also include nozzles, such as oil nozzles 260, to observe the effects of sizing and orientation. The models 442, 444 can incorporate additional system elements to more fully observe heating and cooling effects with respect to other components in close proximity within the gas turbine engine 20 and components that add or remove heat from the oil. Thus, the 3-D structural model 442 and/or thermal model 444 can model multiple components within the bearing compartment 202 and components external to the bearing compartment 202 for a range of mechanical and thermal stresses that may occur over a wide operating range of the gas turbine engine 20. Creation and modification of the design file 440, 3-D structural model 442, and thermal model 444 can be performed by instructions executed on a processing system that can include a processor and memory configured to store the instructions. The processing system can be the processing system 432 or a separate system that provides the design file 440 to the control system 430 for use in building the additively-manufactured part 412.

It will be understood that the additive manufacturing equipment 400 can include other components beyond those depicted in the example of FIG. 4. Further, the additive manufacturing equipment 400 may support manufacturing multiple instances of the additively-manufactured part 412 in parallel. Although the energy source 402 is depicted as a laser, other types of energy sources can be used in the additive manufacturing process.

Figure 5:
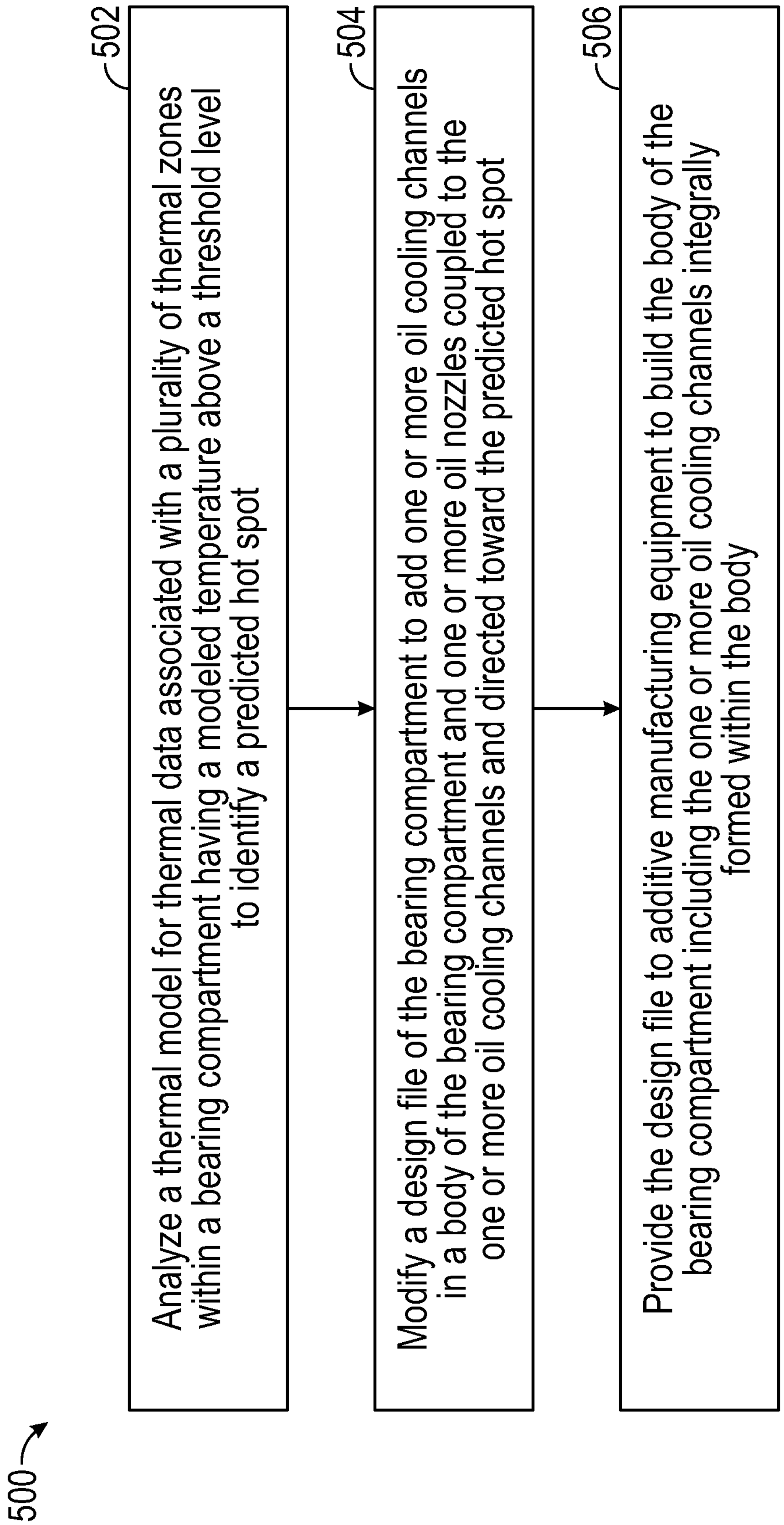
FIG. 5 is a flow diagram illustrating a method of manufacturing a bearing compartment in accordance with embodiments.

With reference to FIG. 5, a method 500 of manufacturing a bearing compartment, such as the bearing compartment 202 described above, is provided. The method 500 can be performed by a processing system and/or a control system, such as control system 430 of FIG. 4. At block 502, the method 500 includes analyzing a thermal model 444 for thermal data associated with a plurality of thermal zones 265 within a bearing compartment 202 having a modeled temperature above a threshold level to identify a predicted hot spot 264. At block 504, the method 500 includes modifying a design file 440 of the bearing compartment 202 to add one or more oil cooling channels 250 in a body 205 of the bearing compartment 202 and one or more oil nozzles 260 coupled to the one or more oil cooling channels 250 and directed toward the predicted hot spot 264. Prior to modifying the design file 440, a 3-D structural model 442 can be modified to observe the modeled impact of the changes, and the thermal model 444 impact can be observed after adding the effects of the one or more oil cooling channels 250. Modifications can be performed iteratively (e.g., in a loop) until a preferred configuration is achieved. At block 506, the method 500 includes providing the design file 440 to additive manufacturing equipment 400 to build the body 205 of the bearing compartment 202 including the one or more oil cooling channels 250 integrally formed within the body 205. The method 500 can also include controlling the additive manufacturing equipment 400 to additively manufacture the bearing compartment 202 based on the design file 440.

In some embodiments, the spring 220 is additively manufactured as a squirrel cage spring, and a centerline D of the struts 222 extend axially in parallel to an axis of rotation defined within a central cavity 240 of the bearing compartment 202. In some embodiments, the spring 220 includes an annular support member, such as the first annular support member 224 and/or the second annular support member 226, and the struts 222.

In some embodiments, at least one of the one or more oil nozzles 260 can be integrally formed with the body 205 of the bearing compartment 202. The body 205 can include a housing 230 of the bearing compartment 202 and/or the body 205 can include a spring 220 integrally formed with the housing 230. The one or more oil cooling channels 250 can be routed through at least one annular support member 224, 226 of the spring 220. The one or more oil cooling channels 250 can include one or more struts 222 of the spring 220. Placement and orientation of the one or more oil nozzles 260 can be configured based on the thermal model 444 and 3-D structural model 442 of the bearing compartment 202.

Figure 6:
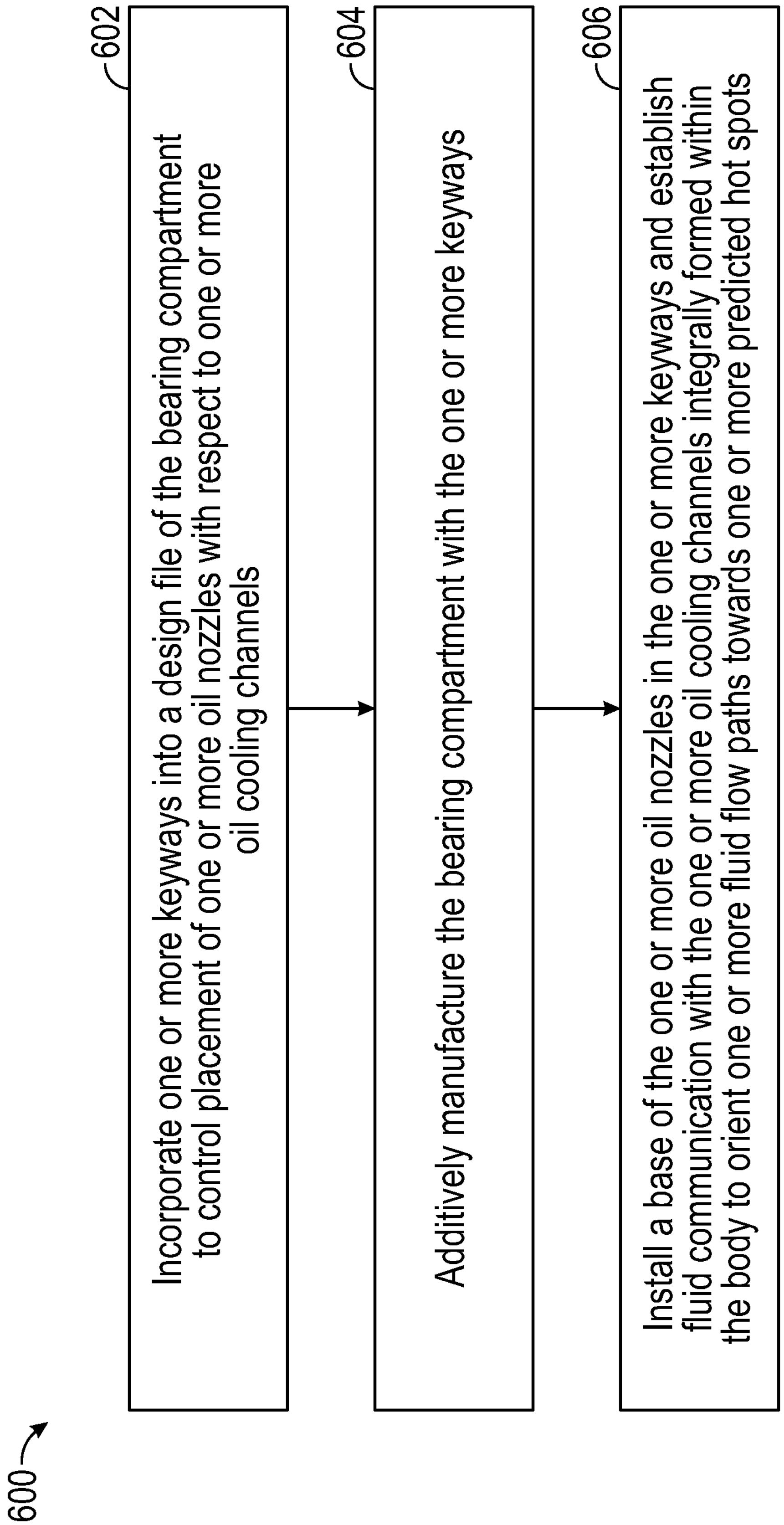
FIG. 6 is a flow diagram illustrating a method of manufacturing a bearing compartment with one or more keyways in accordance with embodiments.

With reference to FIG. 6, a method 600 of manufacturing a bearing compartment, such as the bearing compartment 202 described above, is provided. The method 600 of FIG. 6 can be performed as an extension of the method 500 of FIG. 5 or may be performed separately.

At block 602, one or more keyways can be incorporated into a design file of the bearing compartment 202 to control placement of one or more oil nozzles with respect to one or more oil cooling channels, such as oil nozzles 260 and oil cooling channels 250. At block 604, the bearing compartment 202 with the one or more keyways can be additively manufactured, for instance, using additive manufacturing equipment 400 of FIG. 4. At block 606, a base of the one or more oil nozzles can be installed in the one or more keyways and establish fluid communication with the one or more oil cooling channels integrally formed within the body to orient one or more fluid flow paths towards one or more predicted hot spots. An example keyway is further depicted and described with respect to FIGS. 7-9.

Figure 7:
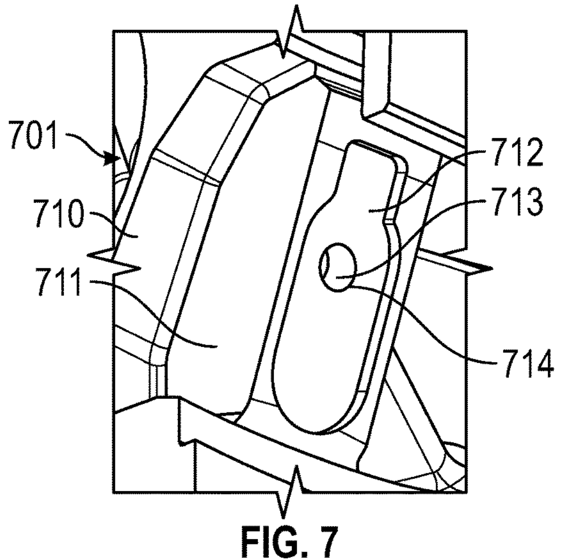
FIG. 7 is a perspective view of a bearing chamber and an interior surface of the bearing chamber with a terminal block in accordance with embodiments.
Figure 8:
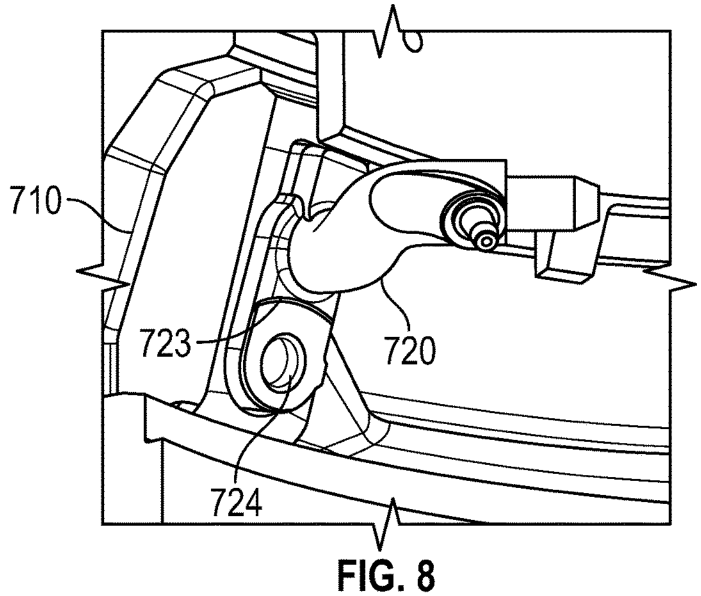
FIG. 8 is a perspective view of the bearing chamber and the interior surface of the bearing chamber with the terminal block of FIG. 7 and an oil nozzle in accordance with embodiments.
Figure 9:
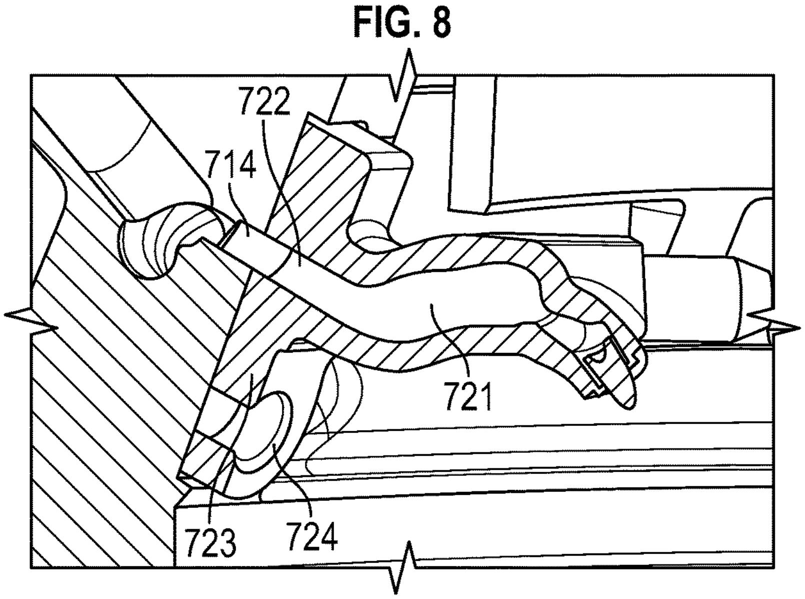
FIG. 9 is a perspective view of the bearing chamber and the interior surface of the bearing chamber with the terminal block of FIG. 7 and an interior of the oil nozzle of FIG. 8 in accordance with embodiments.

With reference to FIGS. 7-9, a bearing chamber 701 is provided and includes an interior surface 710, which can be additively manufactured, and an oil nozzle 720, which can also be additively manufactured. The bearing chamber 701 can be a portion of the bearing compartment 202 of FIG. 2. The interior surface 710 includes a terminal block 711 that is formed to define a keyway 712 and a conduit 713. The conduit 713 can extend through a body of the bearing chamber 701 and terminates at a terminus 714 at the keyway 712. The conduit 713 can be in fluid communication with the port 254. The oil nozzle 720 is an example of oil nozzle 260 of FIG. 4. The oil nozzle 720 can be formed to define an internal channel 721 with an opening 722 and includes a base 723. Both the keyway 712 and the base 723 can be elongate. In any case, the base 723 is tightly fittable in the keyway 712. The base 723 can also include a fastening point 724, at which the base 723 is fastened to the terminal block 711 at the keyway 712.

When the base 723 is tightly fit in the keyway 712 as shown in FIGS. 8 and 9, the opening 722 of the internal channel 721 sits flush against the terminus 714 of the conduit 713 whereby the internal channel 721 is fluidly communicative with the conduit 713. As such, oil or other fluids directed into and through the conduit 713 enter and flow through the internal channel 721. In addition, when the base 722 is tightly fit in the keyway 712, an orientation of the keyway 712 and a configuration of the oil nozzle 720 are cooperatively established to aim the oil nozzle 720 at one or more predefined targets within the bearing chamber 701. In this way, the orientation of the keyway 712 and the configuration of the oil nozzle 720 work cooperatively to aim a flow of oil or other fluids passing through the internal channel 721 toward the one or more predefined targets.

Benefits of the features described herein include providing greater oil routing capability beyond areas that can be reached through separate tubing or through drilled paths in the components. This can be combined with additional cooling fins and other such features as part of a collective heat management approach. Using model data can also assist in confirming that the newly added internal oil paths maintain the structural integrity of the components when connected to an existing pressure head used to feed existing nozzles in the design.

The term "about" is intended to include the degree of error associated with measurement of the particular quantity based upon the equipment available at the time of filing the application. Terms such as "upper" and "lower" are used for purposes of explanation and the designation as such can be altered depending upon component orientation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing compartment comprising:
- a body comprising a housing of the bearing compartment with a spring monolithically formed with the housing, wherein the spring comprises an upper annular support member, a lower annual support member, and a plurality of struts integrally monolithically formed between the upper annular support member and the lower annual support member;
- one or more oil cooling channels integrally formed within the body that is monolithically formed, wherein the one or more oil cooling channels are routed through an upper manifold of the upper annular support member and a lower manifold of the lower annular support member; and
- one or more oil nozzles coupled to the one or more oil cooling channels, wherein at least one of the one or more oil nozzles is oriented to direct oil toward a thermal zone with a predicted hot spot within the bearing compartment.

2. The bearing compartment of claim 1, wherein the at least one of the one or more oil nozzles is integrally formed with the body of the bearing compartment that is monolithically formed.

3. The bearing compartment of claim 1, wherein the one or more oil cooling channels are within one or more of the plurality of struts of the spring.

4. The bearing compartment of claim 1, wherein placement and orientation of the one or more oil nozzles are configured based on a thermal model of a plurality of thermal zones within the bearing compartment.

5. A gas turbine engine comprising:
- a compressor section;
- a turbine section;
- a shaft coupled to the compressor section and the turbine section; and
- a bearing system configured to support rotation of the shaft, the bearing system comprising:
  - a bearing compartment comprising:
    - a body comprising a housing of the bearing compartment with a spring monolithically formed with the housing, wherein the spring comprises an upper annular support member, a lower annual support member, and a plurality of struts monolithically formed between the upper annular support member and the lower annual support member;
    - one or more oil cooling channels integrally formed within the body that is monolithically formed, wherein the one or more oil cooling channels are routed through an upper manifold of the upper annular support member and a lower manifold of the lower annular support member; and
    - one or more oil nozzles coupled to the one or more oil cooling channels, wherein at least one of the one or more oil nozzles is oriented to direct oil toward a thermal zone with a predicted hot spot within the bearing compartment.

6. The gas turbine engine of claim 5, wherein the at least one of the one or more oil nozzles is integrally formed with the body of the bearing compartment that is monolithically formed.

7. The gas turbine engine of claim 5, wherein the one or more oil cooling channels are within one or more of the plurality of struts of the spring.

8. The gas turbine engine of claim 5, wherein placement and orientation of the one or more oil nozzles are configured based on a thermal model of a plurality of thermal zones within the bearing compartment.

* * * * *